(12) United States Patent
Abiri (10) Patent No.: US 9,126,610 B1
(45) Date of Patent: Sep. 8, 2015

(54) COLLAPSIBLE SHOPPING CART APPARATUS

(71) Applicant: Sagi Abiri, Coconut Creek, FL (US)

(72) Inventor: Sagi Abiri, Coconut Creek, FL (US)

( * ) Notice: Subject to any disclaimer, the term of this patent is extended or adjusted under 35 U.S.C. 154(b) by 0 days.

(21) Appl. No.: 14/279,436

(22) Filed: May 16, 2014

(51) Int. Cl.
*B62B 3/00* (2006.01)
*B62B 5/00* (2006.01)

(52) U.S. Cl.
CPC .................................. *B62B 5/0003* (2013.01)

(58) Field of Classification Search
CPC .......... B62B 3/02; B62B 3/027; B62B 5/0003
USPC .......... 280/30, 47.34, 47.35, 79.11, 638, 639, 280/640, 651
See application file for complete search history.

(56) References Cited

U.S. PATENT DOCUMENTS

| | | | | | |
|---|---|---|---|---|---|
| 2,953,287 | A | * | 9/1960 | Werner | 224/496 |
| 3,082,016 | A | * | 3/1963 | Pratt | 280/641 |
| 3,498,628 | A | * | 3/1970 | Ferneau et al. | 280/641 |
| 3,774,929 | A | | 11/1973 | Stanley | |
| 3,931,985 | A | * | 1/1976 | Knebel | 280/42 |
| D280,039 | S | | 8/1985 | Strayer | |
| 4,921,295 | A | * | 5/1990 | Stollenwerk | 296/20 |
| 4,953,878 | A | * | 9/1990 | Sbragia | 280/30 |
| 5,002,292 | A | * | 3/1991 | Myers | 280/33.992 |
| 5,084,922 | A | * | 2/1992 | Louit | 5/86.1 |
| 5,503,424 | A | * | 4/1996 | Agopian | 280/651 |
| 5,649,718 | A | * | 7/1997 | Groglio | 280/641 |
| 6,024,527 | A | | 2/2000 | Soriano | |
| 6,045,150 | A | * | 4/2000 | Al-Toukhi | 280/641 |
| 6,070,899 | A | * | 6/2000 | Gines | 280/651 |
| 6,079,777 | A | * | 6/2000 | Simmons et al. | 297/217.1 |
| 6,126,181 | A | | 10/2000 | Ondrasik | |
| 6,152,462 | A | * | 11/2000 | Barrett | 280/30 |
| 6,575,491 | B2 | * | 6/2003 | Miller | 280/638 |
| 6,976,696 | B2 | * | 12/2005 | O'Krangley et al. | 280/640 |
| 7,080,844 | B2 | * | 7/2006 | Espejo | 280/33.995 |
| 7,188,843 | B2 | * | 3/2007 | Magness | 280/30 |
| 7,229,093 | B1 | * | 6/2007 | Carter | 280/651 |
| 7,246,814 | B2 | | 7/2007 | Prather et al. | |
| 7,306,245 | B1 | * | 12/2007 | Lowe | 280/47.18 |
| 8,052,158 | B2 | * | 11/2011 | Tyrrell | 280/33.992 |
| 8,075,016 | B2 | * | 12/2011 | Silberberg | 280/641 |
| 8,083,253 | B1 | * | 12/2011 | Butler | 280/651 |
| 8,172,256 | B2 | * | 5/2012 | Fine | 280/651 |
| 8,333,404 | B2 | * | 12/2012 | Moster | 280/651 |
| 8,408,581 | B1 | * | 4/2013 | Hunter | 280/651 |
| 8,540,273 | B2 | * | 9/2013 | Dobrachinski | 280/651 |

(Continued)

FOREIGN PATENT DOCUMENTS

EP        1700765 A1 *  9/2006
WO   WO 2005028277 A1 *  3/2005

*Primary Examiner* — Hau Phan
*Assistant Examiner* — Jacob Meyer (57) ABSTRACT

A collapsible shopping cart apparatus allows a person to load and unload items from a vehicle without having to remove the items from a shopping cart. The apparatus includes a plurality of panels including a back panel, a bottom panel, a front panel and a pair of side panels. A frame is coupled to and extends around a perimeter edge of the bottom panel. The frame and the plurality of panels define a basket. A plurality of legs is coupled to the frame. Each of the legs is pivotable relative to the frame between a use position and a storage position. A plurality of swivelable casters is configured for contacting a ground surface when the legs are in the use position. Each of the casters is coupled to a bottom end of an associated one of the legs.

18 Claims, 6 Drawing Sheets

(56) References Cited

U.S. PATENT DOCUMENTS

| | | | |
|---|---|---|---|
| 2002/0149176 A1* | 10/2002 | Miller | 280/651 |
| 2005/0140119 A1* | 6/2005 | Wong | 280/651 |
| 2005/0151333 A1* | 7/2005 | Russell et al. | 280/33.993 |
| 2005/0173878 A1* | 8/2005 | Espejo | 280/47.34 |
| 2005/0263969 A1* | 12/2005 | Cote et al. | 280/33.992 |
| 2005/0275177 A1* | 12/2005 | Buckley, III | 280/47.34 |
| 2008/0061531 A1* | 3/2008 | Nugent | 280/638 |
| 2008/0093827 A1* | 4/2008 | Silberberg | 280/651 |
| 2008/0303248 A1* | 12/2008 | Chaparro | 280/651 |
| 2010/0140887 A1* | 6/2010 | Yehiav et al. | 280/33.991 |
| 2010/0230934 A1* | 9/2010 | Fine | 280/651 |
| 2010/0320732 A1* | 12/2010 | Dobrachinski | 280/651 |
| 2011/0156375 A1* | 6/2011 | Gal | 280/651 |
| 2011/0169235 A1* | 7/2011 | Moster | 280/30 |
| 2011/0304125 A1* | 12/2011 | Ravnborg | 280/651 |
| 2012/0193894 A1* | 8/2012 | Fine | 280/651 |
| 2014/0140797 A1* | 5/2014 | Howe | 414/498 |
| 2014/0346757 A1* | 11/2014 | Fine | 280/651 |
| 2014/0369801 A1* | 12/2014 | Beauchamp et al. | 414/800 |

* cited by examiner

FIG. 6

COLLAPSIBLE SHOPPING CART APPARATUS

BACKGROUND OF THE DISCLOSURE

Field of the Disclosure

The disclosure relates to shopping cart devices and more particularly pertains to a new shopping cart device for allowing a person to load and unload items from a vehicle without having to remove the items from a shopping cart.

SUMMARY OF THE DISCLOSURE

An embodiment of the disclosure meets the needs presented above by generally comprising a plurality of panels including a back panel, a bottom panel, a front panel and a pair of side panels. A frame is coupled to and extends around a perimeter edge of the bottom panel. The frame and the plurality of panels define a basket. A plurality of legs is coupled to the frame. Each of the legs is pivotable relative to the frame between a use position and a storage position. A plurality of swivelable casters is configured for contacting a ground surface when the legs are in the use position. Each of the casters is coupled to a bottom end of an associated one of the legs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
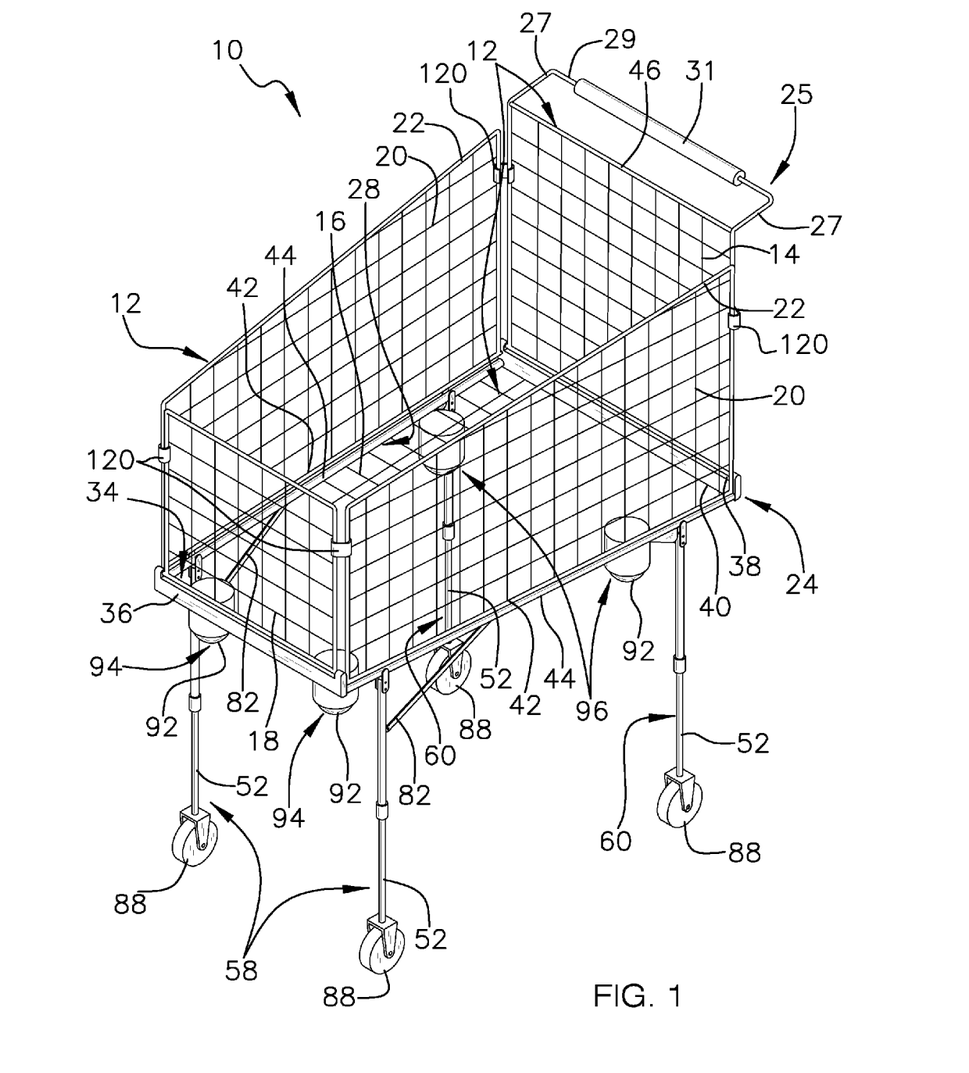
FIG. 1 is a top front side perspective view of a collapsible shopping cart apparatus according to an embodiment of the disclosure.
Figure 2:
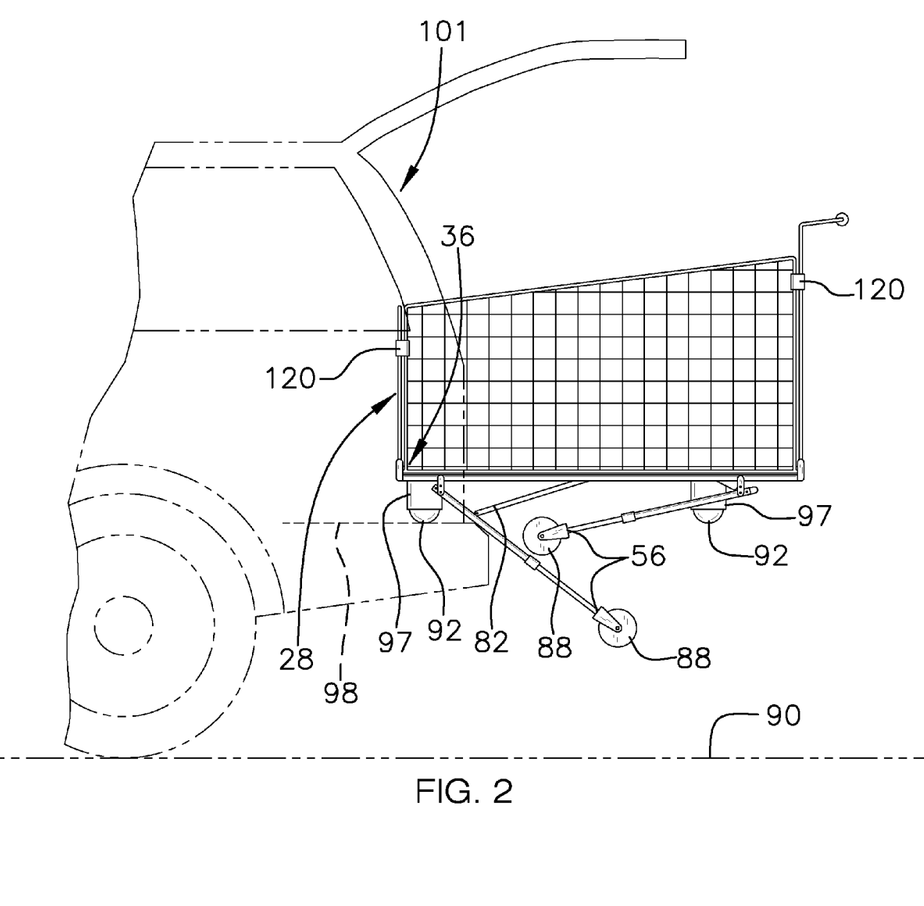
FIG. 2 is an in-use side view of an embodiment of the disclosure.
Figure 3:
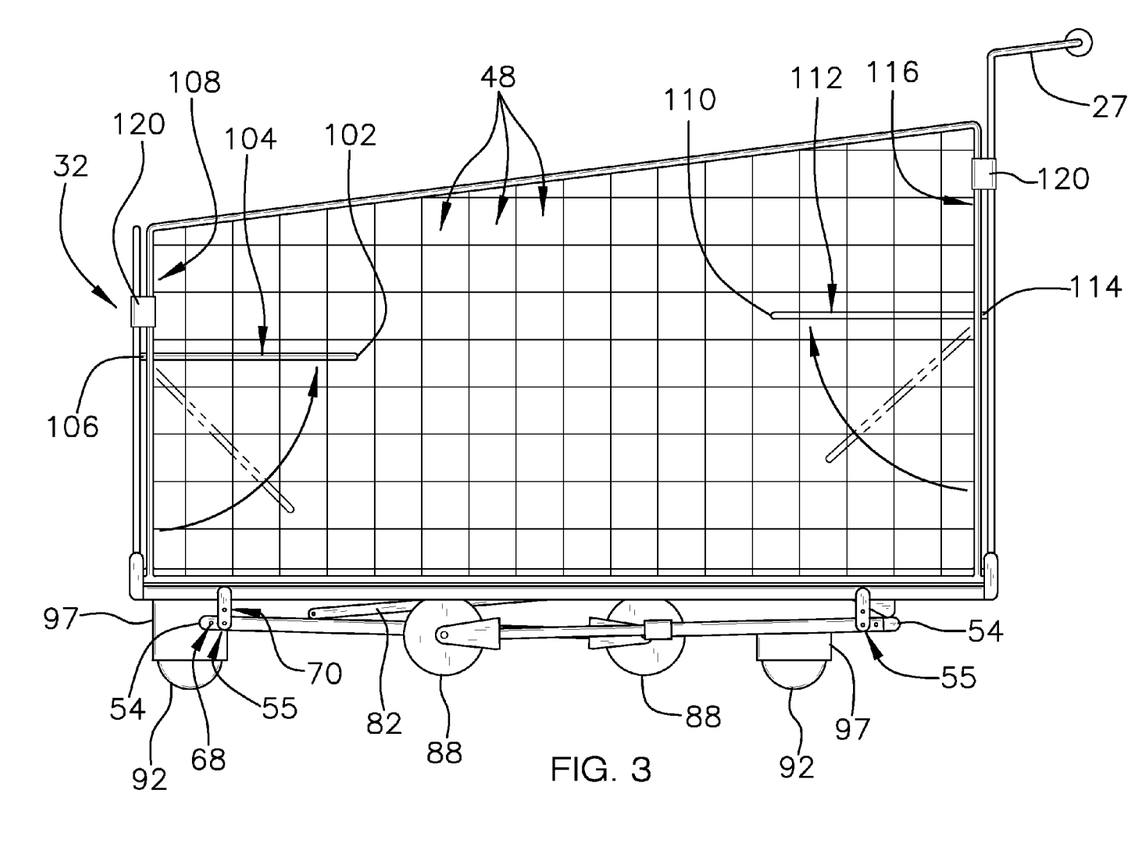
FIG. 3 is a side view of an embodiment of the disclosure showing the legs in the storage position.
Figure 4:
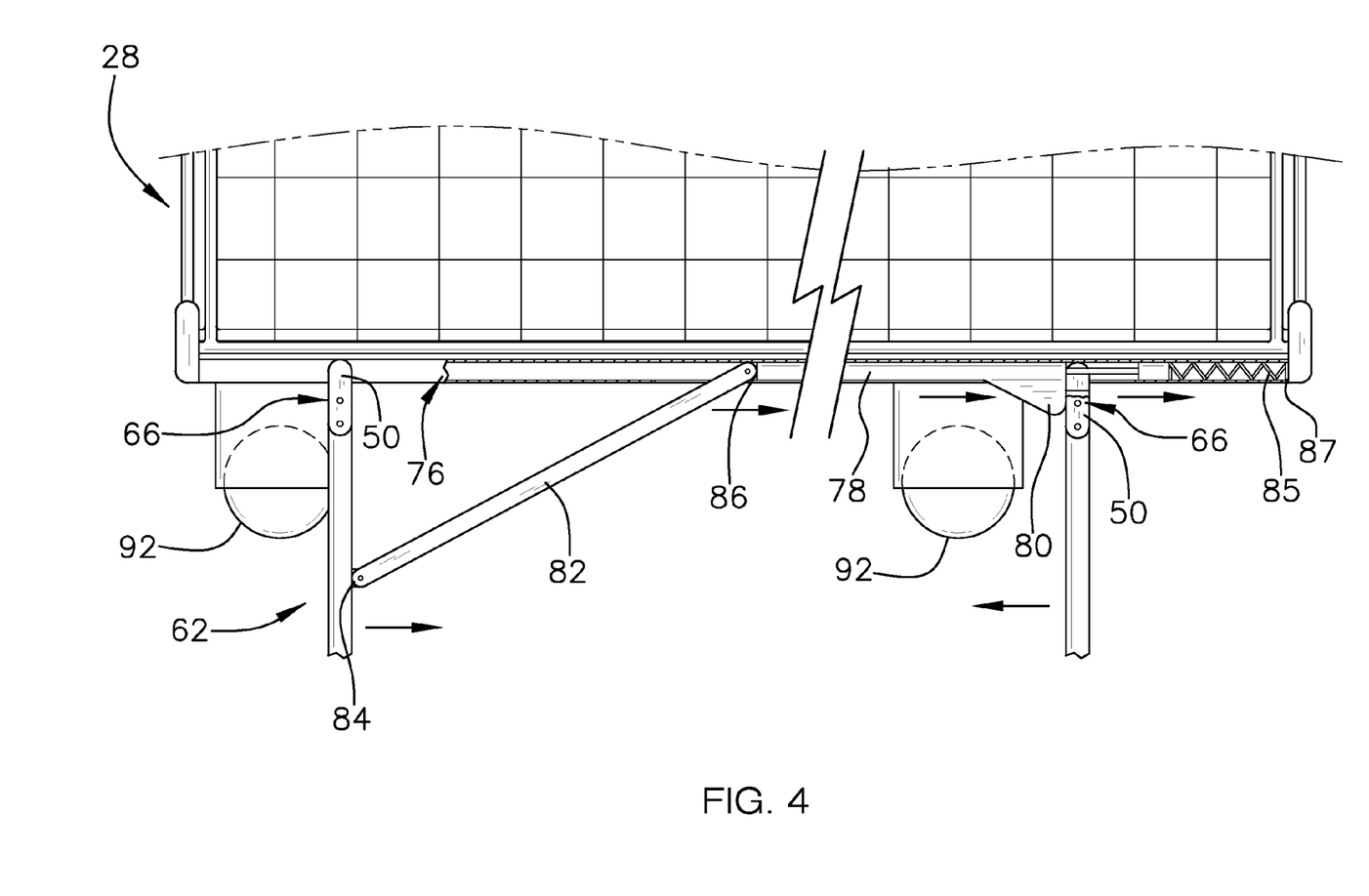
FIG. 4 is a partial side view of an embodiment of the disclosure showing the legs in the use position.
Figure 5:
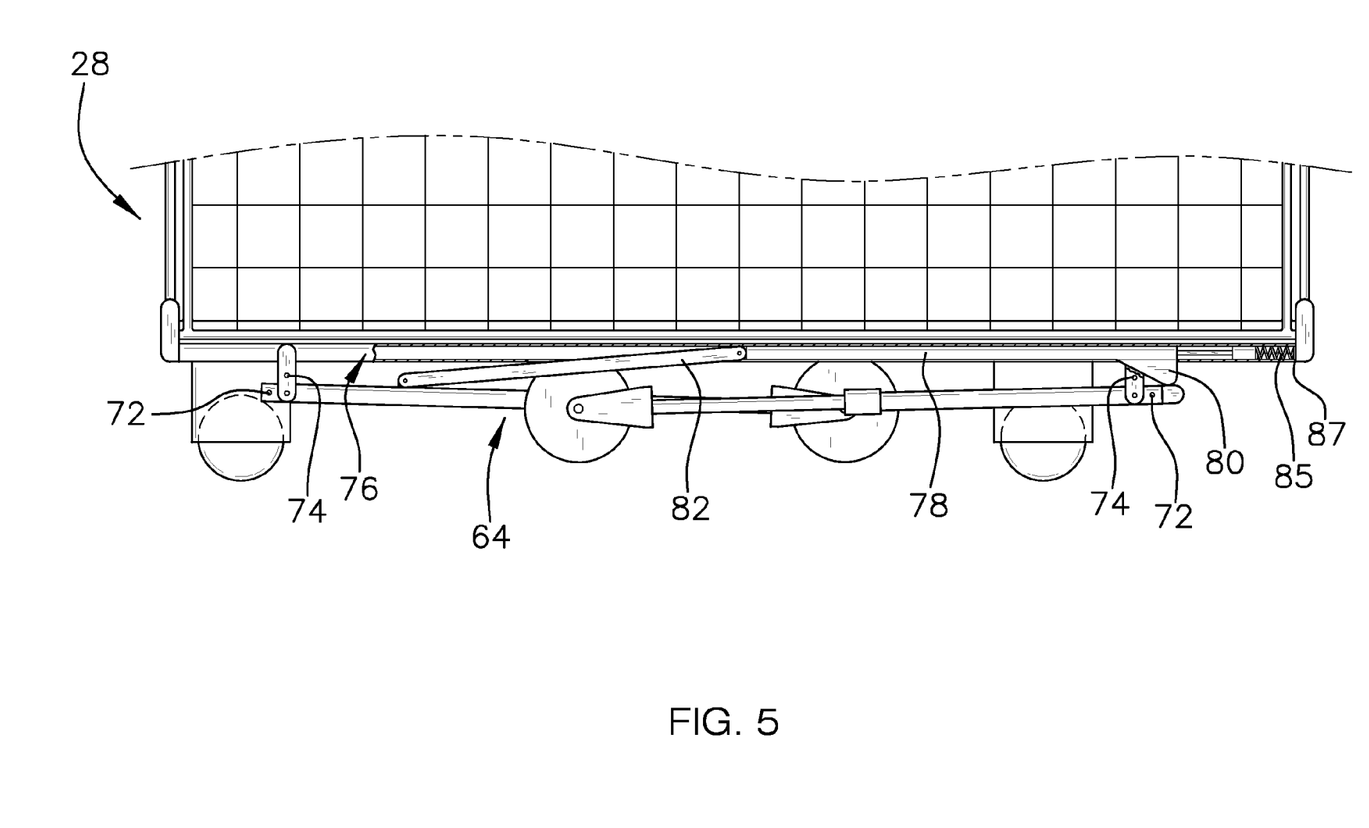
FIG. 5 is a partial side view of an embodiment of the disclosure similar to FIG. 4, except that FIG. 5 shows the legs in the storage position.
Figure 6:
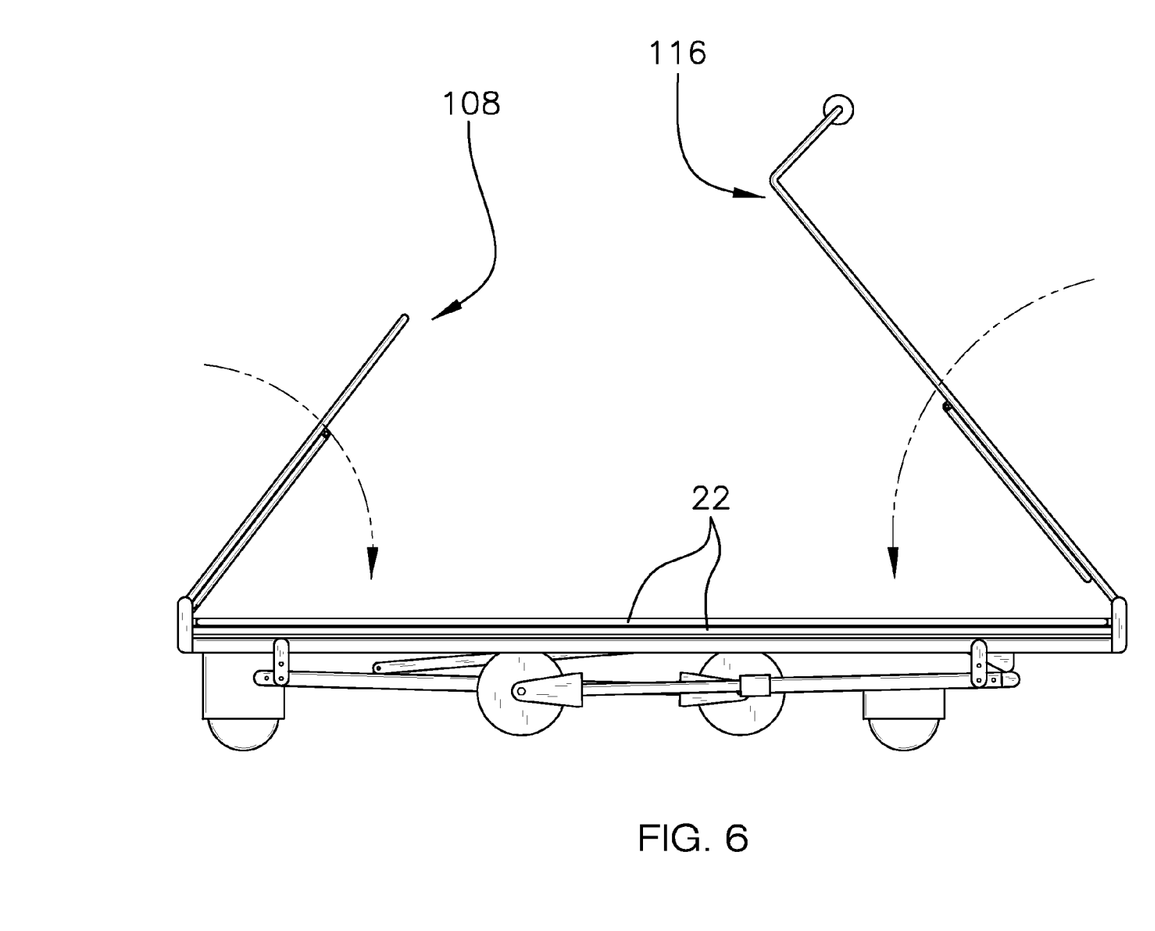
FIG. 6 is a side view of an embodiment of the disclosure showing the basket collapsing to the folded position.

With reference now to the drawings, and in particular to FIGS. 1 through 6 thereof, a new shopping cart device embodying the principles and concepts of an embodiment of the disclosure and generally designated by the reference numeral 10 will be described.

As best illustrated in FIGS. 1 through 6, the collapsible shopping cart apparatus 10 generally comprises a plurality of panels 12. The plurality of panels 12 includes a back panel 14, a bottom panel 16, a front panel 18 and a pair of side panels 20. The side panels 20 extend between the front panel 18 and the back panel 14. The bottom panel 16 extends between the side panels 20 and between the front panel 18 and the back panel 14. An upper edge 22 of each of the side panels 20 may slant upwardly between the front panel 18 and the back panel 14 such that a height of each of the side panels 20 is greatest proximate the back panel 14. A frame 24 is coupled to and extends around a perimeter edge 26 of the bottom panel 16. The frame 24 couples the bottom panel 16 to each of the front panel 18, the back panel 14 and the pair of side panels 20. The frame 24 and the plurality of panels 12 define a basket 28. A handle 25 is coupled to the basket 28. The handle 25 has a pair of spaced arms 27 and a transverse gripping portion 29 coupled to and extending between the spaced arms 27. A cylindrical grip 31 may be coupled to the gripping portion 29 to facilitate grasping of the handle 25.

Locking hinges or the like attach the basket 28 to the frame 24 to allow the basket 28 to be pivotable between a folded position and an unfolded position 32. In particular, the front panel 18 has a bottom edge 34 pivotally coupled to a front portion 36 of the frame 24; the back panel 14 has a lower edge 38 pivotally coupled to a rear portion 40 of the frame 24; and each of the side panels 20 has a lowermost edge 42 pivotally coupled to a respective side portion 44 of the frame 24. Each of the back panel 14, the bottom panel 16, the front panel 18 and the pair of side panels 20 is coplanar when the basket 28 is in the folded position. A plurality of clips 120 is provided to couple each side panel 20 to the back panel 14 and the front panel 18. The clips 120 are selectively detachable from the basket 28 to allow the basket 28 to pivot freely with respect to the frame 24 whereby the basket 28 is collapsible. A top edge 46 of the back panel 14 may extend above each of the front panel 18 and the pair of side panels 20 when the basket 28 is in the unfolded position 32. A plurality of openings 48 may be positioned in the basket 28.

A plurality of leg mounts 50 is coupled to the frame 24. Each of the leg mounts 50 extends downwardly from the frame 24. A plurality of legs 52 is coupled to the frame 24. Each of the legs 52 has a top end 54 and a bottom end 56. The plurality of legs 52 includes a pair of front legs 58 positioned proximate the front panel 18 and a pair of rear legs 60 positioned proximate the back panel 14. Each of the legs 52 is telescopic wherein a length of each of the legs 52 is selectively adjustable. Each of the legs 52 is pivotally coupled to an associated one of the leg mounts 50 at an associated leg pivot point 55 on each of the legs 52. Each of the leg pivot points 55 is spaced from the top end 54 of the associated leg 52. Each of the legs 52 is pivotable between a use position 62 and a storage position 64. The front legs 58 pivot toward the back panel 14 and the rear legs 60 pivot toward the front panel 18 when the legs 52 are pivoted to the storage position 64.

A plurality of leg locking assemblies 66 is provided. Each leg locking assembly 66 is coupled to an associated one of the legs 52 and the associated leg mount 50 such that each leg locking assembly 66 selectively engages the associated leg 52 to the associated leg mount 50 wherein the associated leg 52 is retained in the use position 62. Each of the leg locking assemblies 66 includes a plurality of leg locking members 68 and a plurality of retaining members 70. In particular, each leg locking member 68 comprises a ball 72 extending from the associated leg 52. Each of the balls 72 is positioned between each of the top end 54 and the leg pivot point 55 of the associated leg 52. Each of the retaining members 70 is coupled to an associated one of the leg mounts 50. Each of the leg locking members 68 selectively engages an associated one of the retaining members 70 wherein the associated leg 52 is retained in the use position 62. In particular, each of the retaining members 70 comprises a hole 74 extending through the associated leg mount 50 wherein each ball 72 selectively engages an associated one of the holes 74 wherein the associated leg 52 is retained in the use position 62.

A pair of slots 76 extends into the frame 24. A pair of rods 78 is provided. Each of the rods 78 is positioned in an associated one of the slots 76. Each of the rods 78 includes a tab 80 extending outwardly from the associated rod 78. Each of the tabs 80 abuts an associated one of the rear legs 60 between the top end 54 and the leg pivot point 55 of the associated rear leg 60. A pair of braces 82 is provided. Each of the braces 82 is attached to and extends between the frame 24 and an associated one of the front legs 58. Each of the braces 82 has a first end 84 and a second end 86. The first end 84 of each of the braces 82 is pivotally coupled to the associated front leg 58. The second end 86 of each of the braces 82 is pivotally coupled to an associated one of the rods 78. Each of the braces 82 is configured to pivot the associated front leg 58 and the associated rear leg 60 between the use 62 and storage 64 positions. Each of the braces 82 urge the associated rod 78 against the associated rear leg 60 between the top end 54 and the leg pivot point 55 of the associated rear leg 60 when the associated front leg 58 is pivoted into the storage position 64 such that the associated rear leg 60 is also pivoted into the storage position 64. A pair of biasing members 85 is provided. Each of the biasing members 85 is positioned in an associated one of the slots 76. Each of the biasing members 85 is positioned between an associated one of the rods 78 and a rear end 87 of the associated slot 76 such that each of the biasing members 85 is positioned proximate the back panel 14. Each of the biasing members 85 biases the associated rod 78 away from the back panel 14.

A plurality of swivelable casters 88 is provided. Each of the casters 88 is coupled to the bottom end 56 of an associated one of the legs 52. The casters 88 are configured for contacting a ground surface 90 when the legs 52 are in the use position 62. A plurality of wheels 92 is coupled to the bottom panel 16. The wheels 92 include a pair of front wheels 94 positioned proximate the front panel 18 and a pair of rear wheels 96 positioned proximate the back panel 14. Each of the wheels 92 may be spherical. A plurality of housings 97 is coupled to and extends downwardly from the bottom panel 16. Each of the wheels 92 is mounted in an associated one of the housings 97. Each of the wheels 92 is rotatable within the associated housing 97 and configured for facilitating movement of the basket 28 against a floor surface 98 of a vehicle 101 when the legs 52 are in the storage position 64.

A front support 102 has a top surface 104 being planar. The front support 102 has a top edge 106 pivotally coupled to an inner side 108 of the front panel 18 wherein the top surface 104 is configured to support objects positioned thereon when the top surface 104 is positioned transversely relative to the front panel 18. A rear support 110 is provided and also has an upper surface 112 being planar. The rear support 110 has an upper edge 114 pivotally coupled to an inner side 116 of the back panel 14 wherein the upper surface 112 is configured to support objects positioned thereon when the upper surface 112 is positioned transversely relative to the back panel 14. Each of the front support 102 and the rear support 110 are locked in a conventional manner in order to position the top surface 104 and the upper surface 112 transversely relative to the associated front 18 and back 14 panels. This may be accomplished, for example, by a locking hinge or other conventional locking device.

In use, as stated above and shown in the Figures, the legs 52 are pivoted into the use position 62 and the casters 88 are positioned on the ground surface 90. The basket 28 is expanded and secured together using the clips 120. The apparatus 10 is used in a conventional manner to carry items to be purchased, such as groceries or the like. The legs 52 are then pivoted into the storage position 64 to permit compact storage of the assembly 10 within a vehicle 101. The apparatus 10 operates most efficiently when loaded into a back of a pickup truck, minivan or SUV. The wheels 92 are positioned against the floor surface 98 of the vehicle 101 to allow the basket 28 to slide along the floor surface 98 of the vehicle 101. The objects purchased are able to remain positioned within the basket 28 while being transported to a user's destination. After arriving at the desired destination, the legs 52 are again extended and the casters 88 positioned on the ground surface 90 to allow the apparatus 10 to be moved where desired. The objects purchased can then be removed from the basket 28. In this manner, the apparatus 10 allows a user to load groceries or other purchases into a vehicle 101 without having to remove the objects from the basket 28. The basket 28 can be positioned in the folded position while not in use in order to minimize space taken up by the apparatus 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:
1. A collapsible shopping cart apparatus comprising:
a plurality of panels, said plurality of panels including a back panel, a bottom panel, a front panel and a pair of side panels, said side panels extending between said front panel and said back panel, said bottom panel extending between said side panels and between said front panel and said back panel;
a frame coupled to and extending around a perimeter edge of said bottom panel, said frame coupling said bottom panel to each of said front panel, said back panel and said pair of side panels, said frame and said plurality of panels defining a basket;
a plurality of legs coupled to said frame, each of said legs being pivotable relative to said frame between a use position and a storage position, said plurality of legs including a pair of front legs positioned proximate said front panel and a pair of rear legs positioned proximate said back panel;
a plurality of swivelable casters, each of said casters being coupled to a bottom end of an associated one of said legs, said casters being configured for contacting a ground surface when said legs are in the use position;

a plurality of leg mounts coupled to said frame, each of said leg mounts extending downwardly from said frame, each of said legs being pivotally coupled to an associated one of said leg mounts at an associated leg pivot point on each said leg;

a pair of slots extending into said frame;

a pair of rods, each of said rods being positioned in an associated one of said slots; and a pair of braces, each of said braces being attached to and extending between said frame and an associated one of said front legs, each of said braces having a first end and a second end, said first end of each of said braces being pivotally coupled to said associated front leg, said second end of each of said braces being pivotally coupled to an associated one of said rods, each of said braces being configured to pivot said associated front leg and said associated rear leg between the use and storage positions.

2. The apparatus of claim 1, further comprising an upper edge of each of said side panels slanting upwardly between said front panel and said back panel such that a height of each of said side panels is greatest proximate said back panel.

3. The apparatus of claim 1, further comprising:

said basket being pivotable between a folded position and an unfolded position, said front panel having a bottom edge pivotally coupled to a front portion of said frame, said back panel having a lower edge pivotally coupled to a rear portion of said frame, each of said side panels having a lowermost edge pivotally coupled to a respective side portion of said frame; and a plurality of clips coupling each said side panel to said back panel and said front panel, said clips being selectively detachable from said basket to permit said basket to pivot freely with respect to said frame whereby said basket is collapsible.

4. The apparatus of claim 3, further comprising each of said back panel, said bottom panel, said front panel and said pair of side panels being coplanar when said basket is in the folded position.

5. The apparatus of claim 3, further comprising a top edge of said back panel extending above each of said front panel and said pair of side panels when said basket is in the unfolded position.

6. The apparatus of claim 1, further comprising each of said legs being telescopic wherein a length of each of said legs is selectively adjustable.

7. The apparatus of claim 1, further comprising a front support having a top surface being planar, said front support having a top edge pivotally coupled to an inner side of said front panel wherein said top surface is configured to support objects positioned thereon when said top surface is positioned transversely relative to said front panel.

8. The apparatus of claim 1, further comprising a rear support having an upper surface being planar, said rear support having an upper edge pivotally coupled to an inner side of said back panel wherein said upper surface is configured to support objects positioned thereon when said upper surface is positioned transversely relative to said back panel.

9. The apparatus of claim 1, further comprising a handle coupled to said basket, said handle having a pair of spaced arms and a transverse gripping portion coupled to and extending between said spaced arms.

10. The apparatus of claim 1, further comprising a plurality of wheels coupled to said bottom panel.

11. The apparatus of claim 10, further comprising a plurality of housings coupled to and extending downwardly from said bottom panel, each of said wheels being mounted in an associated one of said housings, said wheels being rotatable within said associated housing and configured for facilitating movement of said basket against a floor surface of a vehicle when said legs are in the storage position.

12. The apparatus of claim 1, further comprising a plurality of leg locking assemblies, each said leg locking assembly being coupled to an associated one of said legs and said associated leg mount such that each said leg locking assembly selectively engages said associated leg to said associated leg mount wherein said associated leg is retained in the use position.

13. The apparatus of claim 12, wherein each of said leg locking assemblies includes a plurality of leg locking members and a plurality of retaining members, each said leg locking member being a ball extending from said associated leg, each of said retaining members being coupled to an associated one of said leg mounts, each of said leg locking members selectively engaging an associated one of said retaining members wherein said associated leg is retained in the use position, each of said retaining members comprising a hole extending through said associated leg mount wherein each said ball selectively engages an associated one of said holes wherein said associated leg is retained in the use position, each of said balls being positioned between each of a top end and said leg pivot point of said associated leg.

14. The apparatus of claim 10, further comprising said wheels including a pair of front wheels positioned proximate said front panel and a pair of rear wheels positioned proximate said back panel.

15. The apparatus of claim 1, further comprising each of said braces urging said associated rod against said associated rear leg between a top end and said leg pivot point of said associated rear leg when said associated front leg is pivoted into the storage position such that said associated rear leg is also pivoted into the storage position.

16. The apparatus of claim 15, further comprising a pair of biasing members, each of said biasing members being positioned in an associated one of said slots, each of said biasing members being positioned between an associated one of said rods and a rear end of said associated slot such that each of said biasing members is positioned proximate said back panel, each of said biasing members biasing said associated rod away from said back panel.

17. The apparatus of claim 15, further comprising each of said rods including a tab extending outwardly from said associated rod, each of said tabs abutting an associated one of said rear legs between said top end and said leg pivot point of said associated rear leg.

18. A collapsible shopping cart apparatus comprising:

a plurality of panels, said plurality of panels including a back panel, a bottom panel, a front panel and a pair of side panels, said side panels extending between said front panel and said back panel, said bottom panel extending between said side panels and between said front panel and said back panel, an upper edge of each of said side panels slanting upwardly between said front panel and said back panel such that a height of each of said side panels is greatest proximate said back panel;

a frame coupled to and extending around a perimeter edge of said bottom panel, said frame coupling said bottom panel to each of said front panel, said back panel and said pair of side panels, said frame and said plurality of panels defining a basket;

wherein said basket is pivotable between a folded position and an unfolded position, said front panel having a bottom edge pivotally coupled to a front portion of said frame, said back panel having a lower edge pivotally coupled to a rear portion of said frame, each of said side panels having a lowermost edge pivotally coupled to a respective side portion of said frame, each of said back panel, said bottom panel, said front panel and said pair of side panels being coplanar when said basket is in the folded position, a top edge of said back panel extending above each of said front panel and said pair of side panels when said basket is in the unfolded position;

a plurality of clips coupling each said side panel to said back panel and said front panel, said clips being selectively detachable from said basket to permit said basket to pivot freely with respect to said frame whereby said basket is collapsible;

a plurality of openings positioned in said basket;

a plurality of leg mounts coupled to said frame, each of said leg mounts extending downwardly from said frame;

a plurality of legs coupled to said frame, each of said legs having a top end and a bottom end, said plurality of legs including a pair of front legs positioned proximate said front panel and a pair of rear legs positioned proximate said back panel, each of said legs being telescopic wherein a length of each of said legs is selectively adjustable, each of said legs being pivotally coupled to an associated one of said leg mounts at an associated leg pivot point on each said leg, each of said leg pivot points being spaced from said top end of said associated leg, each of said legs being pivotable between a use position and a storage position, said front legs pivoting toward said back panel and said rear legs pivoting toward said front panel when said legs are pivoted to the storage position;

a plurality of leg locking assemblies, each said leg locking assembly being coupled to an associated one of said legs and said associated leg mount such that each said leg locking assembly selectively engages said associated leg to said associated leg mount wherein said associated leg is retained in the use position, each of said leg locking assemblies including:
- a plurality of leg locking members, each said leg locking member being a ball extending from said associated leg, each of said balls being positioned between each of said top end and said leg pivot point of said associated leg; and
- a plurality of retaining members, each of said retaining members being coupled to an associated one of said leg mounts, each of said leg locking members selectively engaging an associated one of said retaining members wherein said associated leg is retained in the use position, each of said retaining members comprising a hole extending through said associated leg mount wherein each said ball selectively engages an associated one of said holes wherein said associated leg is retained in the use position;

a pair of slots extending into said frame;

a pair of rods, each of said rods being positioned in an associated one of said slots, each of said rods including a tab extending outwardly from said associated rod, each of said tabs abutting an associated one of said rear legs between said top end and said leg pivot point of said associated rear leg;

a pair of braces, each of said braces being attached to and extending between said frame and an associated one of said front legs, each of said braces having a first end and a second end, said first end of each of said braces being pivotally coupled to said associated front leg, said second end of each of said braces being pivotally coupled to an associated one of said rods, each of said braces being configured to pivot said associated front leg and said associated rear leg between the use and storage positions, each of said braces urging said associated rod against said associated rear leg between said top end and said leg pivot point of said associated rear leg when said associated front leg is pivoted into the storage position such that said associated rear leg is also pivoted into the storage position;

a pair of biasing members, each of said biasing members being positioned in an associated one of said slots, each of said biasing members being positioned between an associated one of said rods and a rear end of said associated slot such that each of said biasing members is positioned proximate said back panel, each of said biasing members biasing said associated rod away from said back panel;

a plurality of swivelable casters, each of said casters being coupled to said bottom end of an associated one of said legs, said casters being configured for contacting a ground surface when said legs are in the use position;

a plurality of wheels coupled to said bottom panel, said wheels including a pair of front wheels positioned proximate said front panel and a pair of rear wheels positioned proximate said back panel, each of said wheels being spherical;

a plurality of housings coupled to and extending downwardly from said bottom panel, each of said wheels being mounted in an associated one of said housings, said wheels being rotatable within said associated housing and configured for facilitating movement of said basket against a floor surface of a vehicle when said legs are in the storage position;

a handle coupled to said basket, said handle having a pair of spaced arms and a transverse gripping portion coupled to and extending between said spaced arms;

a grip coupled to said gripping portion to facilitate grasping of said handle, said grip being cylindrical;

a front support having a top surface being planar, said front support having a top edge pivotally coupled to an inner side of said front panel wherein said top surface is configured to support objects positioned thereon when said top surface is positioned transversely relative to said front panel; and a rear support having an upper surface being planar, said rear support having an upper edge pivotally coupled to an inner side of said back panel wherein said upper surface is configured to support objects positioned thereon when said upper surface is positioned transversely relative to said back panel.

* * * * *